United States Patent
Mars et al.

(10) Patent No.: US 10,513,758 B2
(45) Date of Patent: Dec. 24, 2019

(54) METAL POWDERS AND USE THEREOF

(71) Applicant: HOGANAS AB (PUBL), Hoganas (SE)

(72) Inventors: Owe Mars, Hoganas (SE); Senad Dizdar, Hoganas (SE); Philippe Szabo, Saint Martin d'Heres (FR); Thierry Calmes, Pouilly le Monial (FR)

(73) Assignee: HÖGANÄS AB (PUBL), Höganäs (SE)

( * ) Notice: Subject to any disclaimer, the term of this patent is extended or adjusted under 35 U.S.C. 154(b) by 80 days.

(21) Appl. No.: 15/942,980

(22) Filed: Apr. 2, 2018

(65) Prior Publication Data

US 2018/0223396 A1  Aug. 9, 2018

Related U.S. Application Data

(62) Division of application No. 14/651,839, filed as application No. PCT/EP2013/076326 on Dec. 12, 2013, now Pat. No. 9,957,590.

(30) Foreign Application Priority Data

Dec. 14, 2012  (EP) .................................. 12197170

(51) Int. Cl.
   C22C 38/18    (2006.01)
   C22C 38/22    (2006.01)
   (Continued)

(52) U.S. Cl.
   CPC ............ *C22C 19/07* (2013.01); *B22F 1/0011* (2013.01); *B22F 9/082* (2013.01);
   (Continued)

(58) Field of Classification Search
   CPC ....... C22C 38/002; C22C 38/02; C22C 38/04; C22C 38/08; C22C 38/105; C22C 38/18;
   (Continued)

(56) References Cited

U.S. PATENT DOCUMENTS 4,031,278 A  6/1977  Patel
5,496,391 A  3/1996  Noel

FOREIGN PATENT DOCUMENTS

CN    102286702 A  *  12/2011
CN    102286702 A     12/2011
(Continued)

OTHER PUBLICATIONS

International Search Report (PCT/ISA/210) dated Jun. 12, 2014, by the European Patent Office as the International Searching Authority for International Application No. PCT/EP2013/076326.
(Continued)

*Primary Examiner* — Colleen P Dunn
*Assistant Examiner* — Anthony M Liang
(74) *Attorney, Agent, or Firm* — Buchanan Ingersoll & Rooney P.C.

(57) ABSTRACT

A new pre-alloyed metal based powder, intended to be used in surface coating of metal parts. The powder is deposited using e.g. laser cladding or plasma transfer arc welding (PTA), or thermal spray (e.g. HVOF). The powder is useful for reducing friction and improving wear reducing properties of the deposited coating. Such coatings may also improve machinability. As friction or wear reducing component, inclusions of manganese sulphide or tungsten sulphide in the pre-alloyed powder may be used.

11 Claims, 4 Drawing Sheets

Figure 1:
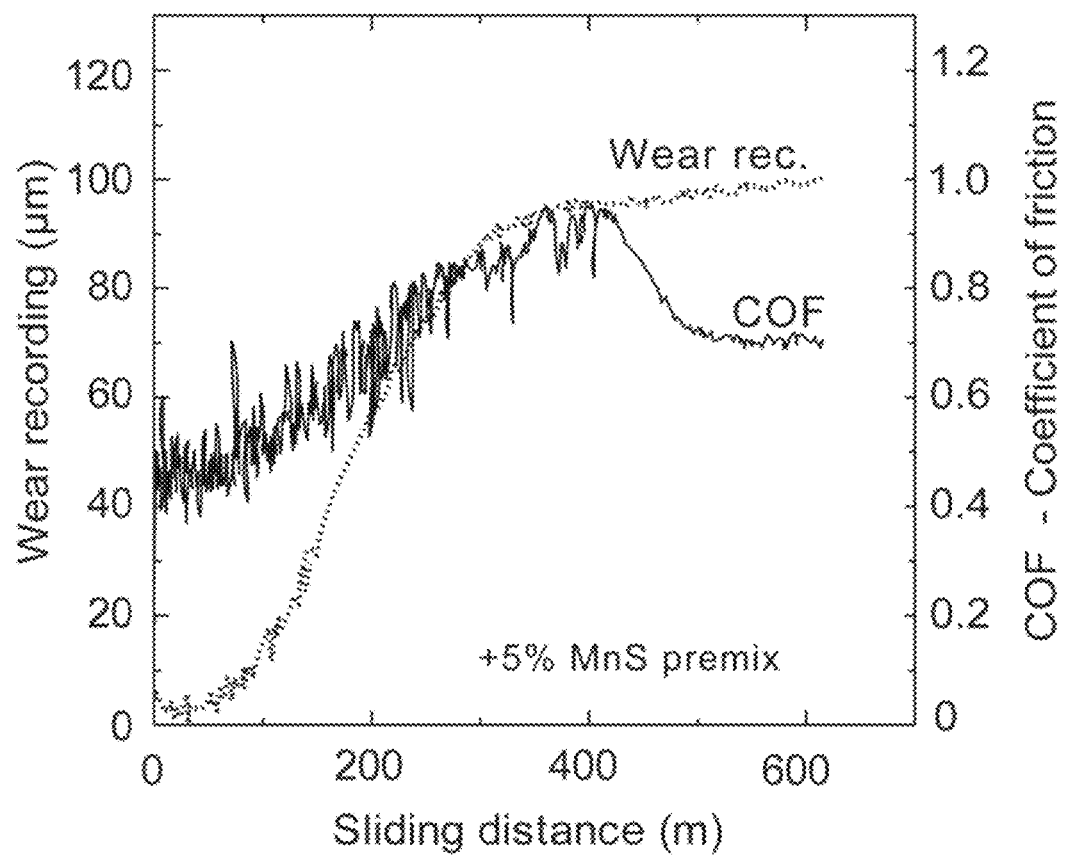

(51) Int. Cl.
| | |
|---|---|
| C22C 38/34 | (2006.01) |
| C22C 38/38 | (2006.01) |
| C22C 38/40 | (2006.01) |
| C22C 38/44 | (2006.01) |
| C22C 38/58 | (2006.01) |
| C22C 19/07 | (2006.01) |
| B22F 1/00 | (2006.01) |
| B22F 9/08 | (2006.01) |
| C22C 1/04 | (2006.01) |
| C22C 19/03 | (2006.01) |
| C22C 33/02 | (2006.01) |
| C22C 19/05 | (2006.01) |
| C22C 30/00 | (2006.01) |
| C22C 38/02 | (2006.01) |
| C23C 4/08 | (2016.01) |
| C23C 24/10 | (2006.01) |
| C23C 4/131 | (2016.01) |
| B23K 35/30 | (2006.01) |
| B23K 35/02 | (2006.01) |
| C23C 4/129 | (2016.01) |
| C23C 4/134 | (2016.01) |

(52) U.S. Cl.
CPC ........ *B23K 35/0255* (2013.01); *B23K 35/308* (2013.01); *B23K 35/3033* (2013.01); *B23K 35/3046* (2013.01); *B23K 35/3053* (2013.01); *B23K 35/3086* (2013.01); *C22C 1/0433* (2013.01); *C22C 19/03* (2013.01); *C22C 19/05* (2013.01); *C22C 19/058* (2013.01); *C22C 30/00* (2013.01); *C22C 33/0221* (2013.01); *C22C 33/0285* (2013.01); *C22C 38/02* (2013.01); *C22C 38/34* (2013.01); *C22C 38/44* (2013.01); *C22C 38/58* (2013.01); *C23C 4/08* (2013.01); *C23C 4/129* (2016.01); *C23C 4/131* (2016.01); *C23C 4/134* (2016.01); *C23C 24/106* (2013.01)

(58) Field of Classification Search
CPC ......... C22C 38/22; C22C 38/34; C22C 38/38; C22C 38/40; C22C 38/44; C22C 38/58; C22C 33/02; C22C 33/0257; C22C 33/0278; C22C 33/0285; B22F 1/0011; B23K 35/0255; B23K 35/3053; B23K 35/3033; B23K 35/3046; B23K 35/308; B23K 35/3086; C23C 24/106; C23C 4/08; C23C 4/129; C23C 4/131; C23C 4/134

See application file for complete search history.

(56) References Cited

FOREIGN PATENT DOCUMENTS

| | | |
|---|---|---|
| DE | 3743167 A1 | 6/1989 |
| EP | 0183666 A1 | 6/1986 |
| WO | 9825720 A1 | 6/1998 |

OTHER PUBLICATIONS

Written Opinion (PCT/ISA/237) dated Jun. 12, 2014, by the European Patent Office as the International Searching Authority for International Application No. PCT/EP2013/076326.

Ocken, "The galling wear resistance of new iron-base hardfacing alloys: a comparison with established cobalt- and nickel-base alloys", Surface and Coatings Technology 76-77, 1995, 456-461.

Skarvelis, et al., "Microstructural and tribological evaluation of potential self-lubricating coatings with MoS2/MnS additions produced by the plasma transferred arc technique", Tribology International 42, 2009, 1765-1770.

* cited by examiner

METAL POWDERS AND USE THEREOF

CROSS REFERENCE TO RELATED APPLICATIONS

The present application is a divisional of U.S. application Ser. No. 14/651,839, filed on Jun. 12, 2015, which is a U.S. national stage of International Application No. PCT/EP2013/076326, filed on Dec. 12, 2013, which claims the benefit of European Application No. 12197170.9, filed on Dec. 14, 2012. The entire contents of each of U.S. application Ser. No. 14/651,839, International Application No. PCT/EP2013/076326, and European Application No. 12197170.9 are hereby incorporated herein by reference in their entirety.

FIELD OF THE INVENTION

The present invention relates to a new pre-alloyed metal based powder, intended to be used in surface coating of metal parts. The powder is deposited using e.g. laser cladding or plasma transfer arc welding (PTA), or thermal spray (e.g. HVOF). The powder is useful for reducing friction and improving wear reducing properties of the deposited coating. Such coatings may also improve machinability. As friction or wear reducing component, inclusions of manganese sulphide or tungsten sulphide in the pre-alloyed powder may be used.

BACKGROUND

Thermal surfacing i.e. thermal spray coating and overlay welding powder grades are widely used for coating of component surfaces against wear and corrosion. Fe-, Ni- and Co-based grades are known to radically improve life time of wear- and/or corrosion exposed components. However, there is still a large number of applications where component life times need to be improved. In addition, high prices and limited availability of Ni and Co on the world market also calls for longer life time improvement. Finally, development of new coating deposition methods like laser cladding, cold spraying and high velocity spraying open new possibilities for alloying, more accurate control of coating process and higher automation, thereby calling for additional types of powders.

A potential approach to improve friction and wear properties may be to incorporate solid lubricant to thermal surfacing grades so that the deposited coating includes friction and wear reducing substances while maintaining acceptable levels of corrosion resistance and hardness.

Solid lubricants are soft solid phase materials which are capable of reducing friction and wear between two surfaces sliding against each other without the need for a liquid media. Materials to be considered as solid lubricants need to meet at least the following criteria: adhere contacting surfaces—stickiness: low shear strength—low intrinsic friction; low hardness—low abrasivity and thermochemical stability for the intended environment. Examples of solid lubricants are; talc, graphite, manganese sulphide (MnS), molybdenum disulphide ($MoS_2$), or tungsten disulphide ($WS_2$). Use of solid lubricants may provide advantages in: stability at extremely low or high temperatures; stability in extreme environments, such as cold or hot environments, or environments having high radiation levels; mechanical design issues (lighter design, reduced critical velocity) or able to carry extreme loads.

For a long time, the use of solid lubricants in thermal surfacing has been a difficult proposition, the reason being that numerous solid lubricants are metal sulphides and that even trace amounts of sulphur in welds can lead to cracking and/or corrosion.

Skarvelis et al; *ASME J. Tribol.* 132 (2010) 031302-1-031302-8, *Surf. & Coat. Techn.* 203 (2009) 1384-1394, and *Trib. Int.* 42 (2009) 1765-1770 describe the use of mixing MnS powder with a metal powder and using the resulting powder mix in e.g. PTA (plasma transferred arc welding).

Solid lubricants, however may have high friction coefficient compared to that of oil or grease; finite wear life for solid lubricant films when renewal is not possible; no or limited cooling capacity compared to oil or grease, or tendency to clogging caused by debris and residual particles.

SUMMARY OF THE INVENTION

Surprisingly, the inventors have noticed that solid lubricants, when present as inclusions in a pre-alloyed metal powder, display a better lubricating effect than when the solid lubricant is present as a powder component in a powder mixture.

The present invention relates to a metal powder which is pre-alloyed with a solid lubricant (e.g. MnS or $WS_2$), and the use of the metal powder for coating the surface of a substrate. The main benefit of using a solid lubricant according to the invention is longer life time in wear- and/or corrosion exposed components.

FIGURES

FIG. 1 Friction coefficient (COF) and wear in a coating made by using a MnS-powder pre-mixed with a metal alloy powder.

Figure 2:
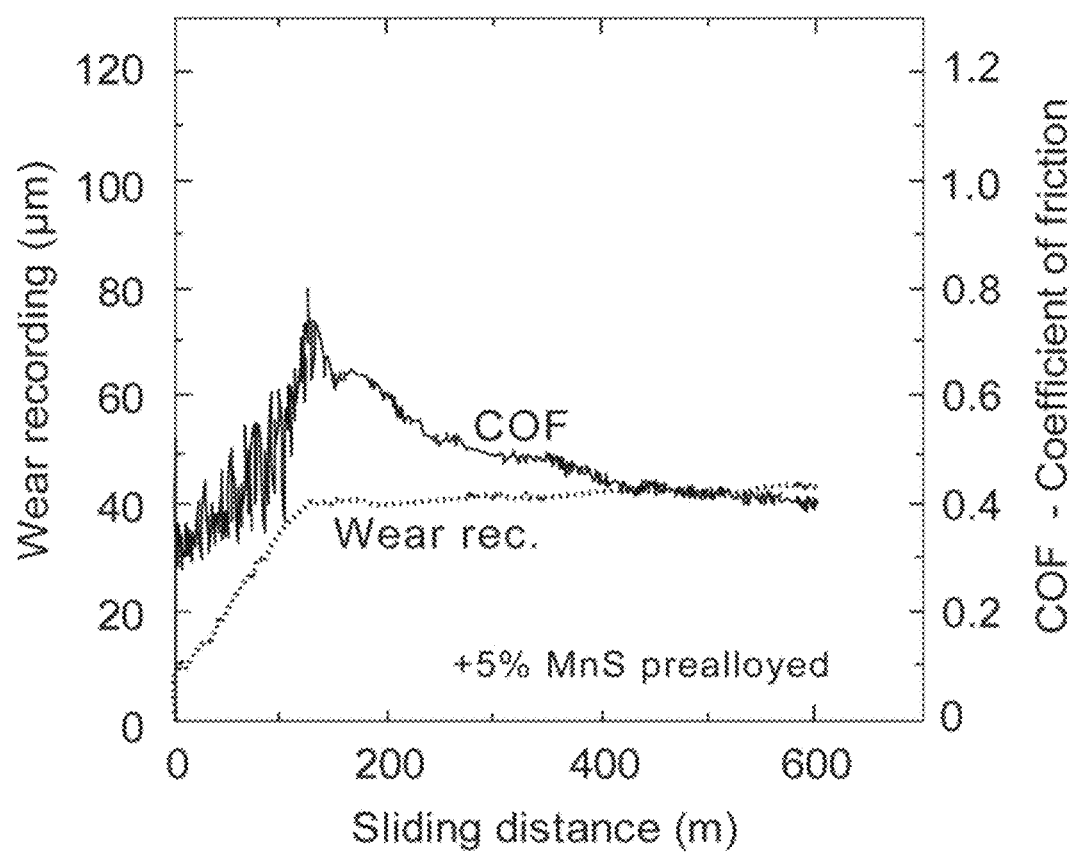

FIG. 2 Friction coefficient (COF) and wear in a coating made by using a pre-alloyed metal powder having inclusions of MnS.

Figure 3:
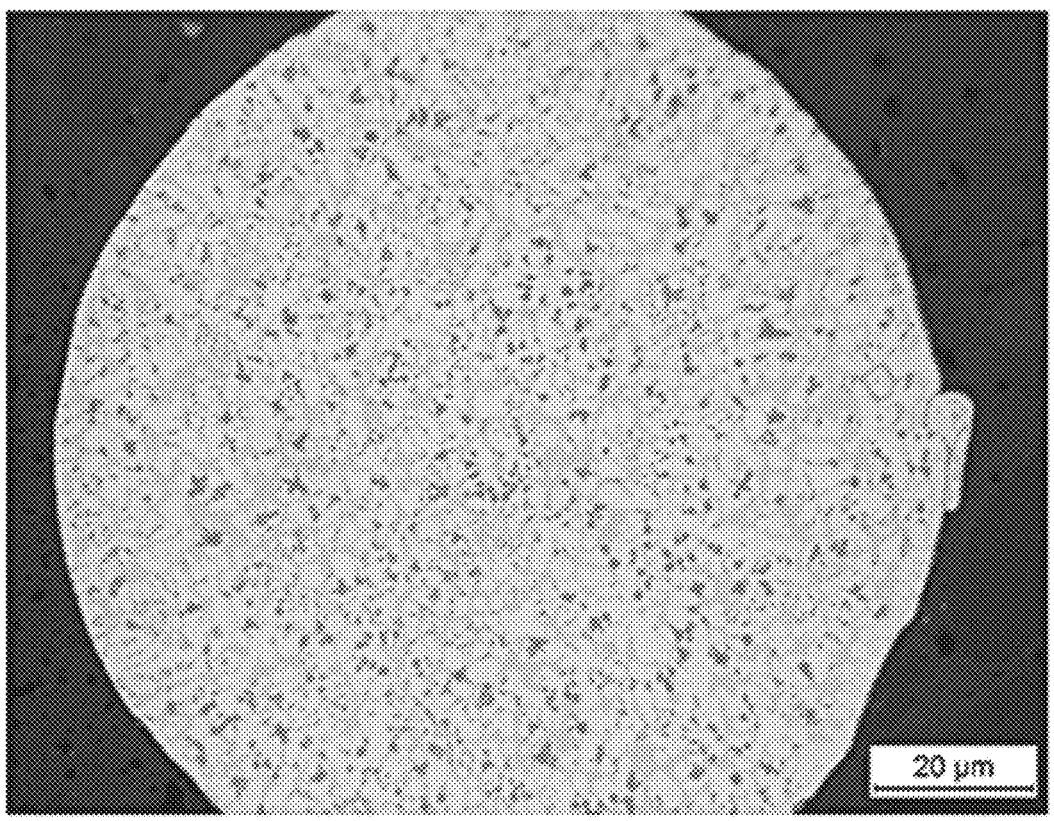

FIG. 3 SEM micrograph of a particle of 1525–30 SP570+ 5% MnS prealloyed powder. Dark grey areas are inclusions containing of MnS.

Figure 4:
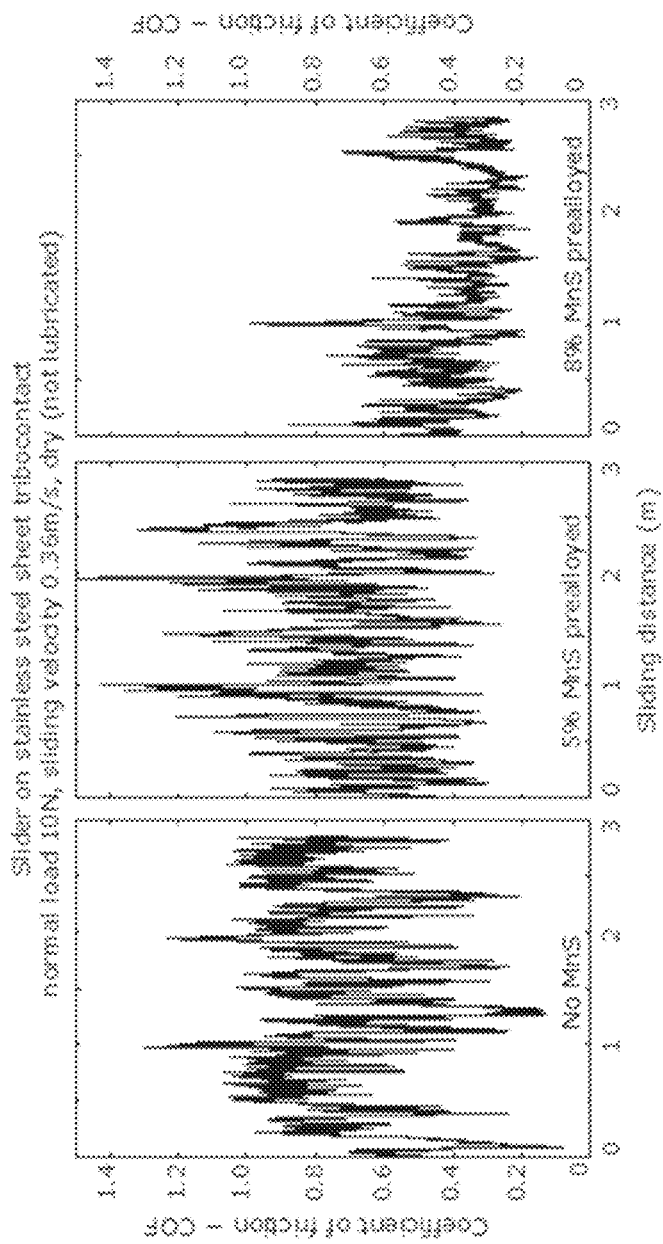

FIG. 4 Slider on sheet wear. Slider on stainless steel sheet tribocontact, normal load 10N, sliding velocity 0.36 m/s, dry (not lubricated). Y-axis shows coefficient of friction, and X-axis shows sliding distance.

DETAILED DESCRIPTION

The present inventors have shown that manganese sulphide, MnS, is a suitable solid lubricant. The results show a potential for friction and wear reduction by Mn and S which is prealloyed to metal powder. The powder pre-alloyed with Mn and S is especially well suited for weld cladding methods, such as laser cladding or PTA. In addition, thermal spray, e.g. flame spray, HVOF, HVAF, coldspray, plasma spray, and the like may also be suitable applications.

Machinability assessed through plane grinding of test is unaltered for alloyed grades made from pre-alloyed metal powder having MnS inclusions, compared to metal alloys without solid lubricant inclusions.

All percentages herein are % by weight.

In one aspect, the invention provides a composition of a pre-alloyed metal powder which comprises manganese sulphide (MnS) or tungsten sulphide (WS2) inclusions. The term "pre-alloyed", as used herein, denotes a metal powder, the powder particles of which have inclusions of e.g. MnS and/or WS2, i.e. Mn and/or W, and S, have been included in the melt when preparing the pre-alloyed powder.

Metal powder alloys suitable for use according to the present invention are typically nickel, iron, or cobalt based.

Consequently, one embodiment of the invention is a composition of a pre-alloyed nickel based metal powder alloy, containing or consisting of C, 0.05-0.4%; Si, 2.0-3.1; B, 0.6-1.5; Cr, 2.6-3.6; Fe, 1.2-2.5; Al, 0.2-0.7; inclusions of MnS, 4-15%; the balance being Ni.

A further embodiment of the invention is a composition of a pre-alloyed cobalt based metal powder alloy, containing or consisting of C, 0.05-0.4%; Si, 2.0-3.1; B, 0.6-1.5; Cr, 2.6-3.6; Fe, 1.2-2.5; Al, 0.2-0.7; inclusions of MnS, 4-15%; the balance being Co.

A further embodiment of the invention is a composition or a pre-alloyed iron based metal powder containing or consisting of 1-1.3% C, 1-1.3%; Cr, 22-27%; Mn, 4-5%; Ni, 3-5%; Si, 3-4%; Mo, 1.5-2.5%; inclusions of MnS 4-15%; the balance being Fe.

A further embodiment of the invention is a composition of a pre-alloyed nickel based metal powder alloy, containing or consisting of C, 0.05-0.2%; Si, 2.2-2.9; B, 0.8-1.3; Cr, 2.8-3.45; Fe, 1.4-2.3; Al, 0.3-0.5; inclusions of MnS, 4-15%; the balance being Ni.

A further embodiment of the invention is a composition of a pre-alloyed cobalt based metal powder alloy, containing or consisting of C, 0.05-0.2%; Si, 2.2-2.9; B, 0.8-1.3; Cr, 2.8-3.45; Fe, 1.4-2.3; Al, 0.3-0.5; inclusions of MnS, 4-15%; the balance being Co.

A further embodiment of the invention is a composition or a pre-alloyed iron based metal powder containing or consisting of 1.2% C, 1.2%; Cr, 25%; Mn, 4.5%; Ni, 4%; Si, 3.3%; Mo, 2%; inclusions of MnS 4-15%; the balance being Fe.

In one embodiment, the amount of MnS and/or $WS_2$ in the form of inclusions is 4-8%, or 5-8%, by weight.

The prealloyed nickel, iron, or cobalt based powder is preferably produced by water or gas atomization of a melt which includes Mn or W, S and other alloying elements chosen from the group consisting of C, Si, B, Cr, Fe, Al, Ni, Co, and V.

The particle size of the pre-alloyed powder alloy is typically from 10 µm to 800 µm, or from 10 µm to 200 µm, or preferably from 15-150 µm, or 50-150 µm.

The solid lubricant (e.g. MnS or $WS_2$) is present as inclusions. These inclusions are made by adding the solid lubricant (e.g. MnS or $WS_2$) to the molten metal as is, or alternatively, FeS may be mixed with appropriate amounts of FeMn and then adding to the molten metal.

In one aspect, the invention provides a method for surface coating metal parts, by way of deposition techniques such as laser cladding or PTA (plasma transferred arc); thermal spray methods such as HVOF (high velocity oxy fuel spray), HVAF (high velocity acetylene fuel spray) or plasma spray; or by slurry methods such as centrifugal casting, with the above mentioned metal powder.

In one embodiment, the invention provides the use according to the above, wherein said metal powder contains 4-10%, or 4-8%, or 5-7% by weight of MnS or WS2 as inclusions.

In a further aspect, the invention also provides metal parts produced by the above mentioned suitable for coating by the powder according to the invention for dry friction contacts in machinery, such as, e.g., industrial valves, sheet metal forming (SMF) tools, transport rollers in iron works, paper knives, and glass moulds.

EXAMPLES

Example 1

Preparation of Pre-Alloyed Powder

A metal powder was prepared as follows; a metal powder with the following composition; C, 0.05-0.2%; Si, 2.2-2.9%; B, 0.8-1.3%; Cr, 2.8-3.45%; Fe, 1.4-2.3%; Al, 0.3-0.5%; MnS, 4-15%; the balance being Ni, was prepared by atomisation of a melt containing the elements above in said amounts. The resulting powder contains MnS as inclusions in a matrix of metal alloy. This powder is herein denoted "Powder A".

Example 2

Preparation of pre-mixed powder was done by mixing a pre-alloyed metal powder with the following composition; C, 0.05-0.2%; Si, 2.2-2.9%; B, 0.8-1.3%; Cr, 2.8-3.45%; Fe, 1.4-2.3%; Al, 0.3-0.5%, with 5 wt % MnS powder in a common powder mixer. This powder is herein denoted "Powder B".

Example 3

Application of Powder by Deposition Using PTA

Pre-alloyed or pre-mixed powder was applied to test samples as follows; Powder A was deposited onto S235JRG (base structural steel) substrate plates by PTA (plasma transfer arc) with parameters set to allow for a dilution of 5-15%.

Example 4

Powder B was spread by hand on substrate as a powder before fusing with the substrate.

Example 5

Powder according to the invention was also applied to substrate by laser cladding. Solid lubricant (MnS) inclusions appeared in coatings from powder A and from powder B. The coating from Powder A appears to result in finer inclusion sizes of MnS than those from Powder B.

Example 6

Wear Testing

Wear testing was performed, and shows the beneficial effects of Powder A in a metal surface coating layer or clad. The specimens were hardfaced rectangular blocks where the base metal was commonly used low carbon structural steel (EN 5235 JRG, ASTM A570 Gr.36) and the surface layer was at least 1 mm thick in the as finished measure. The test surface had a ground finish with surface roughness of Ra 0.3-0.4 µm, prepared by both plane grinding. The counters Ø60/CR100×17 rings are made of AISI 316L (EN X2CrNiMo17 12 2) or AISI 304L (EN X2CrNi19-9) stainless steel. The friction test was unlubricated i.e. dry, and the test samples were carefully cleaned and degreased by ethanol prior to testing. Wear testing was analogous to the testing described in standard ASTM G77. The test maximum Hertzian contact pressure was 180 MPa, angular velocity was 0.36 m/s and the total sliding distance was 594 m.

Example 7

Slider on Sheet Wear Testing

Slider on sheet wear testing was performed, and shows the beneficial effects of Powder A in a metal surface coating layer or clad. The specimens were cylindrical rings ø50/CR5 mx 10 mm where the base metal was commonly used low carbon structural steel (EN S235 JRG, ASTM A570 Gr.36) and the surface layer was at least 0.5 mm thick in the as finished measure. The test surface had a ground finish with surface roughness of Ra 0.3-0.4 µm, prepared by both OD grinding. The counters sheets 1000×1000×1.5 mm were made of AISI 316L (EN X2CrNiMo17 12 2) stainless steel. The friction test was unlubricated i.e. dry, and the test samples were carefully cleaned and then degreased by ethanol prior to testing. The test normal load was 10 N, sliding velocity was 0.36 m/s and the total sliding distance was 3 m. Results are shown in FIG. 4.

Example 8

Corrosion Testing

Outcome of salt spray corrosion testing according to ISO 16701 was performed. The parts were macrophotographed at each interval, after 12, 15, 30 and 39 days. Subsequently, a SEM (scanning electron microscopy) investigation was done. Coating layers from Powder B exhibited an array of 50 µm rust hills after 39 days. The rust initiation was distinguished at 12 days' stop. Coating layers from Powder A achieved a similar type of rust but the number of the rusty hills was much fewer, and the sizes of these were smaller. Quantification of the results may be made by pixelizing the SEM-micrographs, using image analysis software such as Adobe Photoshop.

Embodiments

1. Water or gas atomized metal powder containing or consisting of C, 0.05-0.2%; Si, 2.2-2.9; B, 0.8-1.3; Cr, 2.8-3.45; Fe, 1.4-2.3; Al, 0.3-0.5; inclusions of MnS, 4-15%; the balance being Ni, said powder being suitable for thermal surfacing.

2. Water or gas atomized metal powder containing or consisting C, 0.05-0.2%; Si, 2.2-2.9; B, 0.8-1.3; Cr, 2.8-3.45; Fe, 1.4-2.3; Al, 0.3-0.5; inclusions of MnS, 4-15%; the balance being Co, said powder being suitable for thermal surfacing.

3. Water or gas atomized metal powder containing or consisting of 1.2% C, 1.2%; Cr, 25%; Mn, 4.5%; Ni, 4%; Si, 3.3%; Mo, 2%; inclusions of MnS 4-15%; the balance being Fe, said powder being suitable for thermal surfacing.

4. Metal powder according to any one of embodiments 1-3, wherein the amount of MnS is 4-8%, or 5-7%, by weight.

5. Metal powder according to any one of embodiments 1-4, wherein the particle size of the prealloyed powder alloy is from 45 µm to 200 mm, or from 50-150 µm.

6. Method for surface coating metal parts, by way of laser cladding or PTA (plasma transferred arc), with a metal powder according to any one of embodiments 1-5, thereby producing a metal coated component.

7. Metal coated component produced by the method according to embodiment 6.

8. Metal coated component according to embodiment 7, wherein the component is chosen from the group consisting of industrial valves, sheet metal forming (SMF) tools, transport rollers in iron works, paper knifes, and glass moulds.

The invention claimed is:

1. Water or gas atomized metal powder comprising, by weight:
    C, 1-1.3%;
    Cr, 22-27%;
    Mn, 4-5%;
    Ni, 3-5%;
    Si, 3-4%;
    Mo, 1.5-2.5%;
    inclusions of MnS 4-15%;
    the balance comprising Fe,
    said powder being suitable for thermal surfacing.

2. The water or gas atomized metal powder of claim 1, wherein the power consists of, by weight:
    C, 1-1.3%;
    Cr, 22-27%;
    Mn, 4-5%;
    Ni, 3-5%;
    Si, 3-4%;
    Mo, 1.5-2.5%;
    inclusions of MnS 4-15%;
    the balance consisting of Fe.

3. The water or gas atomized metal powder of claim 1, wherein the power comprises, by weight:
    C, 1.2%;
    Cr, 25%;
    Mn, 4.5%;
    Ni, 4%;
    Si, 3.3%;
    Mo, 2%;
    inclusions of MnS 4-15%;
    the balance comprising Fe.

4. The water or gas atomized metal powder of claim 1, wherein the power consists of, by weight:
    C, 1.2%;
    Cr, 25%;
    Mn, 4.5%;
    Ni, 4%;
    Si, 3.3%;
    Mo, 2%;
    inclusions of MnS 4-15%;
    the balance being Fe.

5. The water or gas atomized metal powder of claim 1, wherein the amount of MnS is 4-8% by weight.

6. The water or gas atomized metal powder of claim 1, wherein the amount of MnS is 5-7% by weight.

7. The water or gas atomized metal powder of claim 1, wherein the particle size of the metal powder is from 45 µm to 200 µm.

8. The water or gas atomized metal powder of claim 1, wherein the particle size of the metal powder is from 50-150 µm.

9. Method for surface coating metal parts, by way of laser cladding or PTA (plasma transferred arc), with a metal powder according to claim 1, thereby producing a metal coated component.

10. Metal coated component produced by the method according to claim 9.

11. Metal coated component according to claim 10, wherein the component is selected from the group consisting of industrial valves, sheet metal forming (SMF) tools, transport rollers in iron works, paper knives, and glass moulds.

* * * * *